United States Patent [19]

Leonard et al.

[11] Patent Number: 5,285,472
[45] Date of Patent: Feb. 8, 1994

[54] SYSTEM FOR DETERMINING THE ACQUISITION OF, AND FREQUENCY COMPENSATING, A PHASE MODULATED PSEUDONOISE SEQUENCE SIGNAL

[75] Inventors: Jay F. Leonard, Kinnelon; Ronald Y. Paradise, Hillsdale, both of N.J.

[73] Assignee: GEC-Marconi Electronic Systems Corp., Wayne, N.J.

[21] Appl. No.: 21,781

[22] Filed: Feb. 24, 1993

[51] Int. Cl.[5] .................... H04K 1/00; H04L 27/30
[52] U.S. Cl. ........................................... 375/1
[58] Field of Search ................................ 375/1

[56] References Cited

U.S. PATENT DOCUMENTS

| | | | |
|---|---|---|---|
| 4,621,365 | 11/1986 | Chiu | 375/1 |
| 4,707,839 | 11/1987 | Andren et al. | 375/1 |
| 5,103,459 | 4/1992 | Gilhousen et al. | 375/1 |
| 5,179,573 | 1/1993 | Paradise | 375/1 |
| 5,184,135 | 2/1993 | Paradise | 375/1 |

OTHER PUBLICATIONS

Fred E. Nathanson, Radar Design Principles, pp. 421-423, McGraw-Hill, 1969.
J. B. Thomas et al., Counterrotator and Correlator for GPS Receivers, NASA TECH BRIEF, vol. 13, No. 6, Item #148, Jet Propulsion Laboratory, Jun. 1989.
T. K. Meehan et al., Chip Advancer for GPS Receiver, NASA TECH BRIEF, vol. 13, No. 6, Item #147, Jet Propulsion Laboratory, Jun. 1989.

*Primary Examiner*—Salvatore Cangialosi
*Attorney, Agent, or Firm*—David L. Davis

[57] ABSTRACT

A system which receives a pseudonoise sequence signal quantizes the signal during a fixed interval of time and passes the quantized signal to a plurality of correlation channels. Each of the correlation channels rotates the incoming phase modulation at a different fixed rate to cancel out a corresponding component of offset frequency. The outputs of the correlation channels are examined to determine whether acceptable correlation has been attained and, if so, which channel provides the best frequency compensation.

7 Claims, 3 Drawing Sheets

SYSTEM FOR DETERMINING THE ACQUISITION OF, AND FREQUENCY COMPENSATING, A PHASE MODULATED PSEUDONOISE SEQUENCE SIGNAL

BACKGROUND OF THE INVENTION

This invention relates to a radio frequency receiving system and, more particularly, to such a system wherein a phase modulated pseudonoise sequence signal is received.

In certain inter-vehicular communication systems, phase modulated pseudo-random noise coded pulses are used for both initial acquisition and data. An acquisition phase is used to acquire time synchronization and frequency correction of the received signal, after which data can be decoded by conventional means. The initial frequency uncertainty may be due to a combination of Doppler frequency shift due to vehicular motion and/or to local oscillator offset or drift. In such a system, it is typical that the vehicle wishing to receive data stepwise rotates its directional receiving antenna and examines any incoming signal to determine whether an appropriate signal is received. During the acquisition phase, the transmitter sends a phase modulated pseudonoise sequence signal, which is a specially coded signal. The receiver must therefore determine whether that coded signal has been received and, if so, whether the frequency of the received signal is such that it can be decoded without undue error.

It is therefore an object of the present invention to provide a low cost hardware implementation of a system for determining the acquisition of a phase modulated pseudonoise sequence signal when the time of arrival and frequency offset are unknown.

It is a further object of the present invention to provide such an arrangement which inherently compensates for frequency offset of the received signal so that errors due to frequency offset are reduced.

SUMMARY OF THE INVENTION

The foregoing and additional objects are attained in accordance with the principles of this invention by providing a plurality of correlation channels. Each of the correlation channels rotates the incoming phase modulation at a different fixed rate to cancel out a corresponding component of offset frequency. The outputs of the correlation channels are examined to determine whether acceptable correlation has been attained and, if so, which channel provides the best frequency compensation.

BRIEF DESCRIPTION OF THE DRAWINGS

The foregoing will be more readily apparent upon reading the following description in conjunction with the drawings in which like elements in different figures thereof have the same reference numeral and wherein.

DETAILED DESCRIPTION

Figure 1:
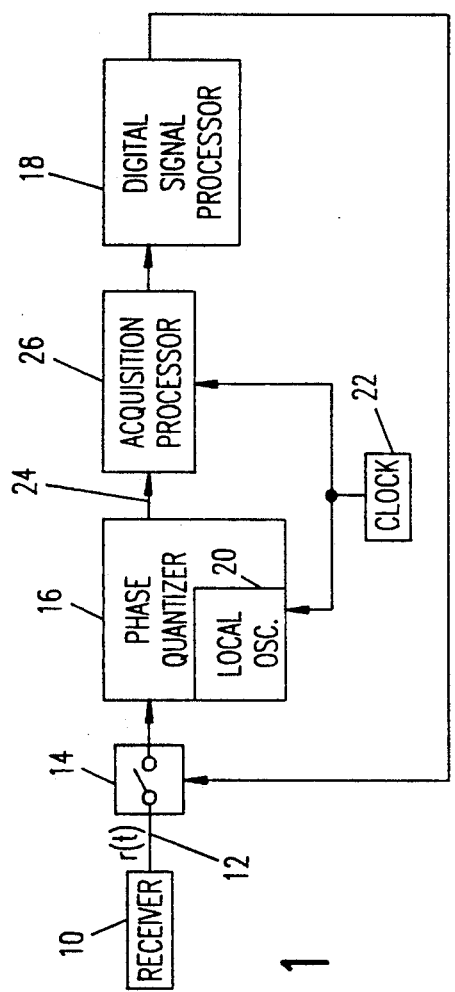
FIG. 1 is a block diagram of a system constructed in accordance with the principles of this invention for determining the acquisition of a received phase modulated pseudonoise sequence signal and providing frequency compensation therefor.

Referring now to FIG. 1, the receiver 10 receives the signal which is an RF/IF carrier at the frequency $f_o$ and which has been phase modulated by a pseudonoise (pseudorandom) code sequence. Illustratively, the modulation is Bi-Phase Shift Key (BPSK), but other modulation schemes such as Minimum Shift Key (MSK) may be utilized as well. The input signal $r(t)$ on the lead 12 at the output of the receiver 10 may be expressed in terms of the following equation:

$$r(t) = \cos(2\pi f_o t + C_i \phi(t - iT))$$

where:

$$\phi(t) = \{90°: -T/2 < t < T/2$$
$$\{0°: \text{Elsewhere}$$
$$C_i = \pm 1 \text{ for } i = 1 \text{ to } M$$

Thus, it is seen that the relative phase during the $i^{th}$ chip interval of duration T is $\pm 90°$ depending on the sign of the $i^{th}$ code element $C_i$, where the chip interval T is the period of the code clock. The code consists of M binary bits chosen to be pseudo-random and to have low autocorrelation values.

The signal $r(t)$ on the lead 12 is applied to the controllable switch 14, from the output of which it goes to the phase quantizer 16. The state of the switch 14 is controlled by the digital signal processor 18. According to this invention, at regular intervals the switch 14 is closed to allow the received signal $r(t)$ to be input to the phase quantizer 16. The phase quantizer 16 includes a local oscillator 20 which provides a reference signal at the nominal carrier frequency $f_o$. Once closed, the switch 14 remains closed for a period of time sufficient to receive a predetermined number of repetitions, illustratively six, of the pseudonoise code sequence.

The phase quantizer 16 uses the local oscillator 20 to derive in-phase and quadrature components of the received signal $r(t)$ relative to the local oscillator signal at the frequency $f_o$. The system shown in FIG. 1 also includes a clock 22 which provides a clock signal at a clock frequency $f_c$ corresponding to the chip rate of the code (i.e., $f_c = 1/T$). The phase quantizer 16 utilizes the clock signal from the clock 22 and the in-phase and quadrature components for quantizing the phase of the received signal $r(t)$ into $2^S$ sectors, where S is an integer, and provides on the leads 24 to the acquisition processor 26 an S-bit digital signal representative of the quantized phase at a rate corresponding to the clock frequency $f_c$. Illustratively, S=3 so that the phase of the received signal $r(t)$ is quantized into octants. As will be described in full detail hereinafter, the acquisition processor 26 determines when the received signal $r(t)$ has been properly acquired (according to established criteria) and what frequency compensation is required. The acquisition processor 26 signals the digital signal processor 18 upon proper acquisition of the signal $r(t)$ and thereafter provides the frequency compensated signal to the digital signal processor 18.

Over the time of interest for receiving the signal $r(t)$, the Doppler frequency shift and the frequency offset from the nominal carrier frequency $f_o$ is constant. This results in a continuous rotating bias of the quantized phase octants, which must be eliminated. In a particular implementation, where the chip frequency $f_c=5$ megahertz and the code sequence includes 32 chips, the maximum loss that can be tolerated with the error rate continuing to meet specifications is 0.4 dB. For that maximum allowable loss, the maximum frequency offset is 26 kilohertz. According to the present invention, the range of frequencies around the nominal carrier frequency $f_o$ in which the signal r(t) is received is subdivided into a plurality of equal subdivisions. Based upon the maximum allowable loss, each of these subdivisions is approximately ±26 kilohertz. If six subdivisions are provided, then the total frequency offset can span a range of ±156 kilohertz with the error rate still being within specifications.

According to this invention, a plurality of frequency compensation channels are provided to span the maximum expected frequency offset range. Each compensation channel rotates the incoming phase modulation by a fixed rate to cancel out the indicated component of offset frequency. It does this by incrementing the phase in ±45° steps at eight times per cycle of the indicated frequency. Each compensation channel includes a correlator and the channel with the greatest correlation is selected by the acquisition processor 26.

Figure 2:
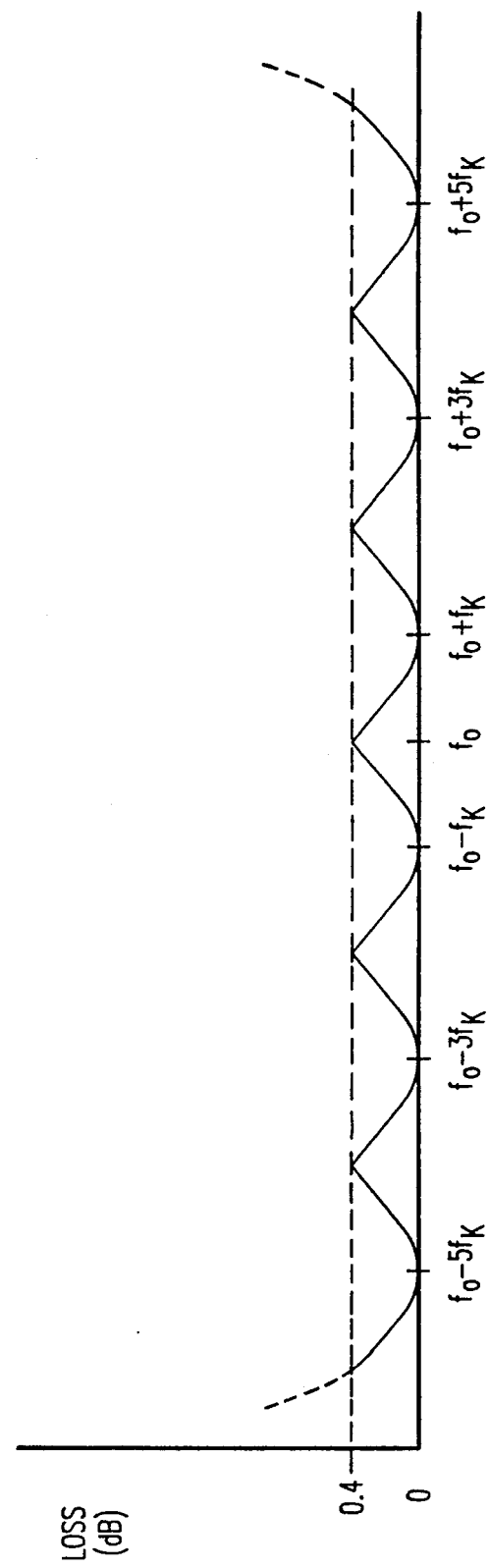
FIG. 2 illustrates the range of frequencies within which the received signal can appear and the division of that range into subdivisions according to this invention, further showing how the loss is limited within that range.

FIG. 2 illustrates the loss curve within the frequency range of interest when the frequency range is divided into subdivisions according to this invention. Thus, the frequency range is centered around the nominal carrier frequency $f_o$ with K subdivisions on each side of the frequency $f_o$. Each of the subdivisions has a range of $2f_K$, where $f_K$ is chosen to be the maximum frequency offset wherein the loss is such that the error rate still meets the system specifications. Thus, each of the subdivisions is centered at a detection frequency equal to $f_o \pm (2i-1)f_K$, where i equals 1, 3, ..., 2K−1. Accordingly, within each subdivision, the received frequency is never offset from the detection frequency more than the maximum amount for which the loss can be tolerated (i.e., $f_K$). Illustratively, for 0.4 dB of loss, $f_K$ is chosen to be 26 kilohertz. Therefore, each subdivision spans 52 kilohertz and the total frequency range for six subdivisions is 312 kilohertz. Within this range of 312 kilohertz, the loss never exceeds 0.4 dB. It is to be noted that if the incoming signal is exactly at the nominal carrier frequency $f_o$, it will be offset from a detection frequency by $\pm f_K$, but the loss will still be allowable.

Figure 3:
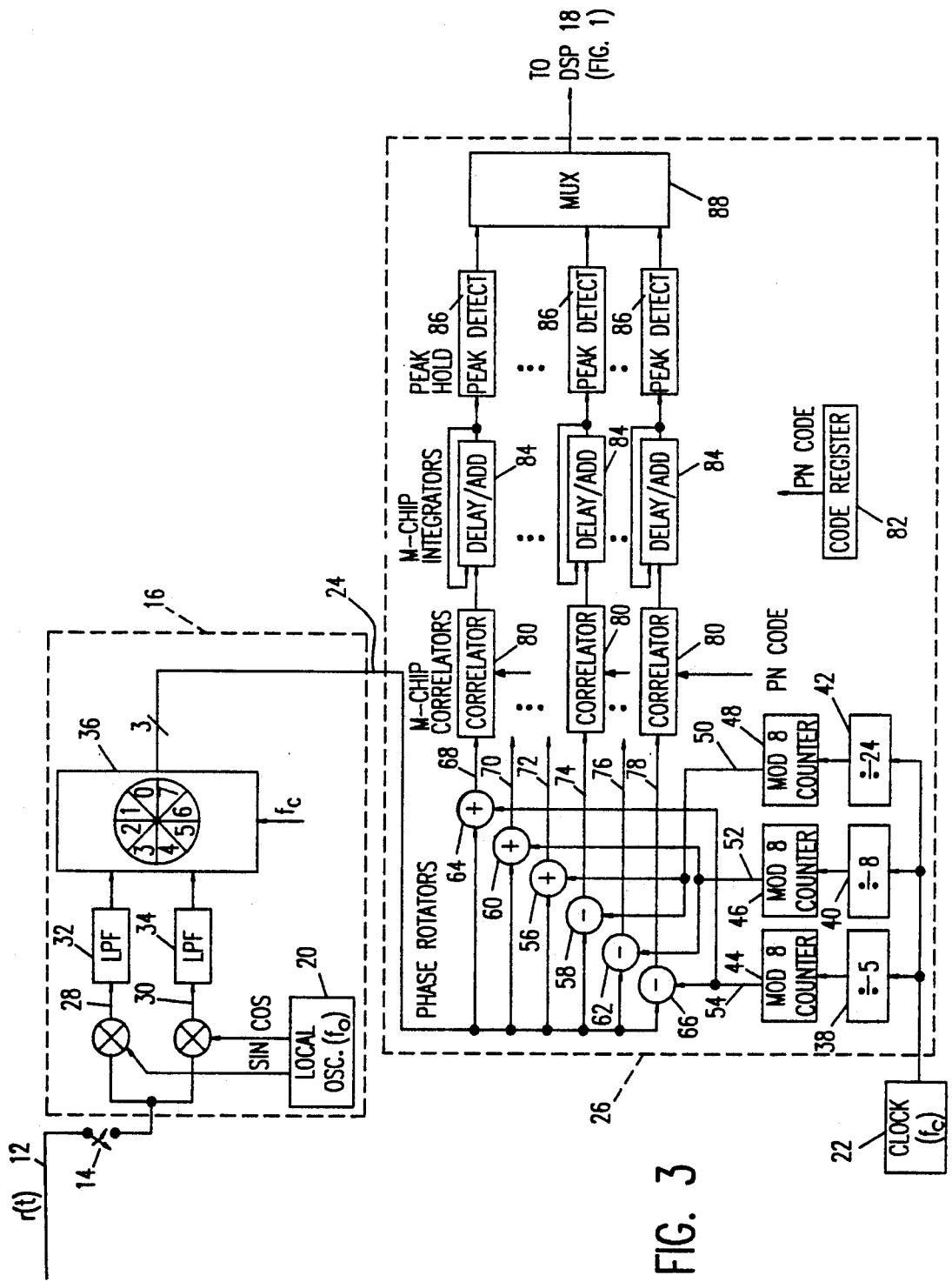
FIG. 3 is a more detailed block diagram of a portion of the system shown in FIG. 1.

FIG. 3 shows illustrative implementations for the phase quantizer 16 and the acquisition processor 26 of FIG. 1. When the switch 14 is closed, the received signal r(t) on the lead 12 is split and mixed with sine and cosine signals generated by the local oscillator 20 at the frequency $f_o$ to generate in-phase and quadrature components of the input signal on the leads 28 and 30, respectively. The in-phase and quadrature components are then passed through conventional low pass anti-aliasing filters 32 and 34, respectively. The in-phase and quadrature components are treated as components of a vector and are quantized, at the clock frequency $f_c$, by the octant quantizer 36, which compares the two vector components to determine which of eight phase octants the received signal sample is in. This octant information is then encoded into three bits on the leads 24. The digitized phase quantized signals on the leads 24 are then provided, at the chip rate, as inputs to the acquisition processor 26.

The acquisition processor 26 includes as many correlation channels as there are subdivisions of the possible frequency range (i.e., 2K correlation channels). Thus, in the illustrative embodiment, there are six correlation channels. Each of the correlation channels provides frequency compensation at a respective detection frequency equal to $f_o \pm (2i-1)f_K$, where i=1, 3, ... 2K−1. The detection frequencies are derived from the clock 22 by providing a plurality of K (illustratively three) frequency dividers 38, 40 and 42, each of which has its output coupled to a respective mod $2^S$ (illustratively eight) counter 44, 46 and 48. Since the chip frequency $f_c=5$ megahertz, and it is desired that $f_K=26$ kilohertz, the divider 42 is chosen to divide the clock signal by twenty-four, since when followed by the mod eight counter 48, this provides a twenty-six kilohertz signal on the leads 50. Similarly, the divider 40 is chosen to divide by eight to provide a seventy-eight kilohertz signal on the leads 52. It is desired that the signal on the lead 54 be at a frequency of 130 kilohertz. However, in order to use integer frequency division, the divider 38 is chosen to divide by a factor of five, so that the frequency of the signal on the leads 54 is actually 125 kilohertz.

Each of the signals on the leads 50, 52 and 54 is utilized twice, once in an additive sense and once in a subtractive sense, for combining with the digitized phase quantized signals on the leads 24. Thus, the signals on the leads 50 are provided to the positive adder 56 and to the negative adder 58. Similarly, the signals on the leads 52 are provided to the positive adder 60 and the negative adder 62. Likewise, the signals on the leads 54 are provided to the positive adder 64 and the negative adder 66. In effect, each of the adders 56, 58, 60, 62, 64 and 66 functions to change the digital signal representation of the quantized phase of the received signal at a respective rate, either positively or negatively, corresponding to one of the detection frequencies, thus providing six phase rotated received signals on the leads 68, 70, 72, 74, 76 and 78.

A correlation channel is provided for each of the phase rotated signals. Each of the correlation channels includes an M-chip correlator 80, where M is the number of bits in the pseudonoise code sequence, illustratively thirty-two. The pseudonoise code is stored in the register 82 and provided to each of the correlators 80. The outputs of the correlators 80 are provided as inputs to the non-coherent M-chip delay/add integrators 84 which in turn have their outputs provided to the peak detectors 86. Each of the correlators 80 provides a maximum output when the incoming signal sequence phase pattern matches the reference pseudonoise code sequence. The outputs of the peak detectors 86 are provided to the multiplexer 88, whose output is provided to the digital signal processor 18. The operation of the acquisition processor 26 will be more fully explained with reference to FIGS. 4A-4F.

Figure 4A:
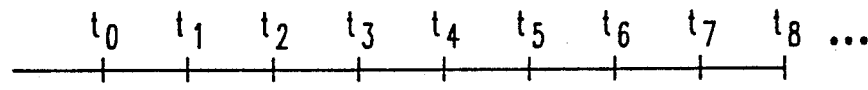
FIGS. 4A–4F show waveforms useful in understanding the present invention.
Figure 4B:
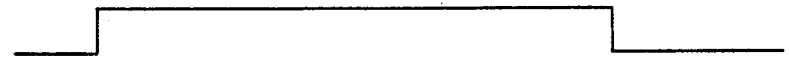
Figure 4C:
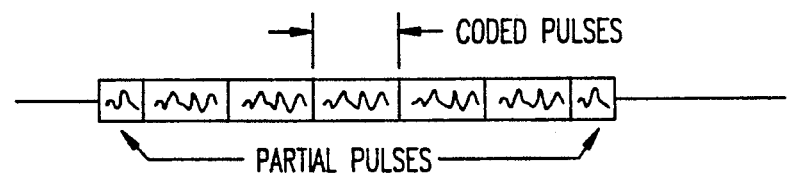
Figure 4D:
Figure 4E:
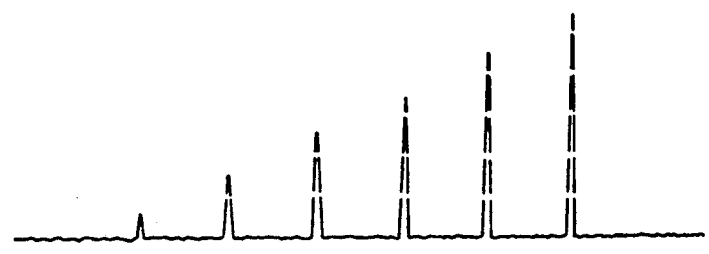
Figure 4F:
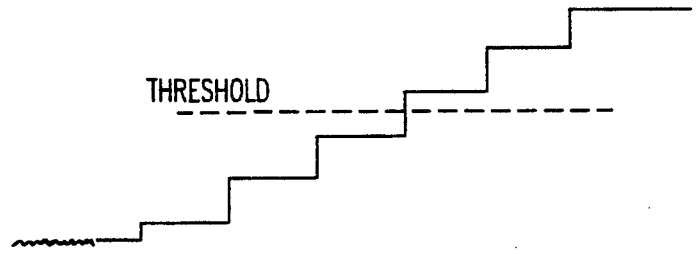

FIG. 4A shows a time line, where the time between successive indicated times (e.g., between $t_1$ and $t_2$) is the time for thirty-two chips (a single "coded pulse") at a five megahertz rate. FIG. 4B illustrates closure of the switch 14 under control of the digital signal processor 18. Thus, the switch 14 is closed at time $t_0$ and opened at time $t_6$. FIG. 4C shows the signal r(t) after passing through the switch 14. Thus, since the time of arrival of the signal is not known, a partial coded pulse passes through, followed by five full coded pulses, followed by a partial coded pulse, in the time it takes for six full coded pulses, in this example. FIG. 4D illustrates the output of an M-chip correlator 80 and FIG. 4E illustrates the output of an integrator 84 which sums the successive outputs of the correlator 80. This sum is then provided to a peak detector 86, whose output is illustrated in FIG. 4F. These outputs are then passed through the multiplexer 88 to the digital signal processor 18 at time $t_7$. The digital signal processor 18 determines whether the output of any of the six correlation channels exceeds a predetermined threshold. This threshold is chosen to be at a sufficient level such that if the integrated correlation exceeds that threshold, then the signal processing errors are sufficiently low to meet the system specifications. If the threshold is exceeded, "acquisition" is declared and the digital signal processor 18 selects the correlation channel which provided the largest output at its peak detector 86. Only that channel is then utilized for the rest of the data detection cycle, since it provides the best frequency offset correction. In the event that the threshold is not exceeded by any of the correlation channels, "no acquisition" is declared, the contents of the correlation channels are dumped, and the procedure is repeated.

In summary, the Doppler shift or frequency offset resulted in a continuous rotating bias of the quantized phase octants at the output of the quantizer 16. Elimination of this bias is effected according to this invention by adding and subtracting phase ramps of different slopes and then determining which slope provides the best correlation.

In the past, Doppler shift determination or compensation was made prior to quantizing the received signal. According to the present invention, both the Doppler shift determination and compensation are made after quantizing with the same hardware and without complex multipliers. The acquisition processor 26 of this invention can be implemented in a single VLSI device, the basic elements of which already exist as macros in typical VLSI standard cell libraries. Thus, the present invention enjoys a low cost/low complexity advantage.

Another advantage of the present invention is in its performance. A conventional approach, such as is employed frequently by global positioning system (GPS) equipment, utilizes only one Doppler compensation channel instead of K parallel channels. In this approach, potential Doppler frequency corrections are tested sequentially and after K such operations the "best" Doppler frequency compensation is selected. This conventional approach minimizes the hardware required but increases the acquisition time by a factor of K over the present invention. However, for many systems applications, rapid acquisition is mandatory and the present invention satisfies that requirement.

The present invention can also be utilized with various waveform/parameter variations. If the chip rate is increased, this provides faster acquisition, but requires greater modulation bandwidth plus increased signal power to maintain the same error rates. Chip rates up to forty megahertz can be supported in accordance with this invention before the hardware complexity becomes a difficult problem with today's technology. In addition, the present invention can be utilized with increased code length (e.g., M>32). This provides more processing gain, allows a reduction in power and improves low probability of unauthorized interception. However, as M doubles, the lengths of the correlators double and the number of correlator channels doubles. Hence, the VLSI complexity grows as the square of the increased code length. By increasing the gate window of FIG. 4B to more than six delay/add cycles, improved acquisition probability can be achieved at the expense of increased acquisition time. If non-repeating pulse codes are utilized, this would decrease detectability by undersired interceptors, but would impose another dimension of uncertainty, time synchronization, in addition to the uncertainty of spatial alignment and Doppler shift. Such a growth in hardware complexity or in acquisition time would be difficult to cope with.

Accordingly, there has been disclosed an improved system for determining the acquisition of, and frequency compensating, a phase modulated pseudonoise sequence signal. While an illustrative embodiment of the present invention has been disclosed herein, it is understood that various modifications and adaptations to the disclosed embodiment will be apparent to those of ordinary skill in the art and it is only intended that this invention be limited by the scope of the appended claims.

We claim:

1. In a system where a phase modulated pseudonoise sequence signal is received at a frequency which is within a range of frequencies centered around a nominal carrier frequency, and wherein code elements in the signal occur at a predetermined code chip rate, an arrangement for determining acquisition of the received signal and approximating the received frequency within one of 2K substantially equal subdivisions of said range, where K is an integer, the arrangement comprising:
    means for providing a reference signal at the nominal carrier frequency;
    means for providing a clock signal at a clock frequency corresponding to the code chip rate;
    means for deriving in-phase and quadrature components of the received signal relative to the reference signal;
    means utilizing the clock signal and the in-phase and quadrature components for quantizing the phase of the received signal into $2^S$ sectors, where S is an integer, and providing an S-bit digital signal representative of the quantized phase at a rate corresponding to the clock frequency;
    means for providing K signals each at a respective fixed detection frequency less than said clock frequency, the frequencies of the K signals being related to each other in the ratios of approximately 1, 3, ..., 2K−1, wherein the K fixed detection frequencies are selected to satisfy the requirement that the range of frequencies within which said received signal appears is approximately 4K times the lowest frequency of said K signals;
    means for providing said pseudonoise sequence in digital form as an ordered sequence of code elements;
    a plurality of 2K correlation channels, each of said correlation channels including:
        a) phase rotation means for providing a phase rotated received signal by changing the quantized phase sector of the received signal at a rate determined by a respective one of the K signals and in a respective one of the additive or subtractive directions, so that between all of the 2K correlation channels each of the K signals is used twice, once in an additive sense and once in a subtractive sense; and
        b) digital correlation means utilizing the provided pseudonoise sequence and the phase rotated received signal for providing a measure of the correlation between the phase rotated received signal and the pseudonoise sequence; and discrimination means coupled to receive the correlation measures from said 2K correlation channels for determining the acquisition of the received signal and selecting the correlation channel with the greatest correlation.

2. The arrangement according to claim 1 wherein each of said correlation channels further includes:

c) delay/add integration means coupled to receive the output of the digital correlation means for summing the output over the length of the pseudonoise sequence; and d) peak detection means for holding the maximum output of the delay/add integration means and providing the maximum output to the discrimination means.

3. The arrangement according to claim 2 wherein the discrimination means includes means for determining whether any of the maximum outputs from the peak detection means of the 2K correlation channels exceeds a predetermined threshold to determine the acquisition of the received signal.

4. The arrangement according to claim 1 wherein $K=3$ and $S=3$.

5. The arrangement according to claim 1 wherein said means for providing K signals includes a plurality of frequency dividers coupled to receive said clock signal, each of said dividers having its output coupled to a respective mod $2^S$ counter.

6. A method for detecting acquisition of a received phase modulated pseudonoise sequence signal, comprising the steps of:

a) deriving in-phase and quadrature components of the received signal relative to a reference signal corresponding to the nominal carrier frequency of the received signal;

b) quantizing the phase of the received signal into $2^S$ sectors;

c) providing an S-bit digital signal representation of the quantized phase at a rate corresponding to a clock frequency which corresponds to the chip rate of the code elements in the received signal;

d) providing K signals each at a respective fixed detection frequency less than the clock frequency, the frequencies of the K signals being related to each other in the ratios of approximately 1, 3, . . . , $2K-1$, and wherein the actual carrier frequency of the received signal is within a range of approximately 4K times the lowest frequency of the K signals, the range being centered at the nominal carrier frequency;

e) changing the digital signal representation of the quantized phase in both the additive and subtractive directions at rates corresponding to the frequencies of the K signals so as to provide 2K phase rotated received signals;

f) providing the pseudonoise sequence in digital form as an ordered sequence of code elements;

g) correlating each of the 2K phase rotated received signals with the ordered sequence of code elements;

h) determining whether any of the correlations of the 2K phase rotated signals exceeds a predetermined threshold; and i) if the predetermined threshold is exceeded, determining which of the 2K phase rotated received signals has the maximum correlation.

7. The method according to claim 6 wherein the step of correlating includes the steps of:

j) digitally correlating each of the 2K phase rotated received signals with the ordered sequence of code elements;

k) integrating the results of each of the digital correlations over the length of the pseudonoise sequence; and l) holding the maximum results of the integrations.

* * * * *